(12) United States Patent
Sun et al.

(10) Patent No.: US 10,585,200 B2
(45) Date of Patent: Mar. 10, 2020

(54) PROCESSING METHODOLOGY FOR FULL-WAVEFORM SONIC WAVEFIELD SEPARATION

(71) Applicant: Saudi Arabian Oil Company, Dhahran (SA)

(72) Inventors: Xuekai Sun, Beijing (CN); Chris B. Ayadiuno, Dhahran (SA); Carlos Planchart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/130,768

(22) Filed: Sep. 13, 2018

(65) Prior Publication Data

US 2019/0011585 A1 Jan. 10, 2019

Related U.S. Application Data

(63) Continuation of application No. 15/592,979, filed on May 11, 2017.

(51) Int. Cl.
*G01V 1/32* (2006.01)
*G01V 1/30* (2006.01)
*G01V 1/50* (2006.01)
*G01V 1/40* (2006.01)

(52) U.S. Cl.
CPC ............... *G01V 1/32* (2013.01); *G01V 1/303* (2013.01); *G01V 1/40* (2013.01); *G01V 1/50* (2013.01); *G01V 2210/46* (2013.01); *G01V 2210/57* (2013.01)

(58) Field of Classification Search
CPC . G01V 1/32; G01V 1/303; G01V 1/40; G01V 2210/46; G01V 2210/57
See application file for complete search history.

(56) References Cited

U.S. PATENT DOCUMENTS

| | | | |
|---|---|---|---|
| 4,648,039 A | 3/1987 | Devaney et al. |
| 4,703,460 A | 10/1987 | Kurkjian et al. |
| 6,449,560 B1 | 9/2002 | Kimball |
| 6,614,716 B2 | 9/2003 | Plona et al. |
| 6,625,541 B1 | 9/2003 | Shenoy et al. |
| 7,203,600 B2 | 4/2007 | Keers et al. |
| 7,492,664 B2 | 2/2009 | Tang et al. |
| 8,395,966 B2 | 3/2013 | Moore et al. |

(Continued)

FOREIGN PATENT DOCUMENTS

| | | |
|---|---|---|
| GB | 2536179 | 9/2016 |
| WO | WO 2016057384 | 4/2016 |

OTHER PUBLICATIONS

Yu et al., Wavelet-Radon Domain De-Aliasing and Interpolation of Seismic Data, Oct. 10-15, 2004, SEG Int'l Exposition and 74th Annual Meeting, Denver, Colorado, 4 pp. (Year: 2004).*

(Continued)

*Primary Examiner* — Toan M Le
(74) *Attorney, Agent, or Firm* — Fish & Richardson P.C.

(57) ABSTRACT

A method for full-waveform sonic (FWS) wavefield separation includes receiving FWS data; performing an anti-aliasing linear Radon transform on the received FWS data; extracting Radon-transformed FWS data corresponding to a wave component using a slanted window; and determining signals of the wave component by performing an inverse Radon transform on the extracted Radon-transformed FWS data.

17 Claims, 6 Drawing Sheets

(56) References Cited

U.S. PATENT DOCUMENTS

| | | | |
|---|---|---|---|
| 8,521,433 | B2 | 8/2013 | Hirabayashi et al. |
| 8,811,114 | B2 | 8/2014 | Geerits et al. |
| 8,880,348 | B2 | 11/2014 | Bolshakov et al. |
| 9,453,925 | B2 | 9/2016 | Beasley et al. |
| 2002/0138202 | A1 | 9/2002 | Ruben |
| 2003/0076741 | A1 | 4/2003 | Robertsson et al. |
| 2004/0223412 | A1 | 11/2004 | Haldorsen |
| 2008/0319675 | A1 | 12/2008 | Sayers |
| 2009/0067286 | A1 | 3/2009 | Bose et al. |
| 2018/0329097 | A1* | 11/2018 | Sun .................. G01V 1/32 |

OTHER PUBLICATIONS

Burg, "Maximum Entropy Spectral Analysis: Appendix B," a dissertation submitted to the Department of Geophysics and the Committee on Graduate Studies of Standford University in Partial Fulfillment of the Requirements of the Degree of Doctor of Philsophy, May 1975, 4 pages.

Burg, "The Relationship between maximum entropy spectra and maximum likelihood spectra,", Geophysics vol. 37, No. 2, Apr. 1972, 2 pages.

Capon et al., "Multidimensional maximum-likelihood processing of a large aperture seismic array. Proc.," Inst. Elect. Electron. Eng. vol. 55, Feb. 1967, 20 pages.

Capon, "High-resolution frequency-wavenumber spectrum analysis. Proc.," Inst. Elect. Electron. Engin. vol. 57, No. 8, Aug. 1969, 11 pages.

Duckworth and Baggeroer, "Inversion of refraction data from the fram and nansen basins of the arctic ocean," AD-A196 424 Tectonophysics vol. 114, Apr. 20, 1985, 48 pages.

Fomel, "Shaping regularization in geophysical-estimation problems," Geophysics 72(2) R29-R36, Mar.-Apr. 2007, 8 pages.

Hsu and Baggeroer, "Application of the maximum-likelihood method (MLM) for sonic velocity logging," Geophysics, 51(3), Mar. 1986, 8 pages.

Liu et al., "Random noise attenuation using f-x regularized nonstationary autoregression," Geophysics vol. 72, Issue 2, V61-V69, Mar.-Apr. 2012, 9 pages.

Pendrel and Smylie, "The relationship between maximum entropy and maximum likelihood spectra," Geophysics vol. 44, No. 10, Oct. 1979, 2 pages.

Greenhalgh et al., "Controlled Direction Reception Filtering of P- and S-waves in τ-p Space," Geophysical Journal International, vol. 100, Published in 1990, pp. 221-234.

Hampson, "Inverse Velocity Stacking for Multiple Elimination," Journal of Canadian Society Exploration Geophysics 22, Dec. 1986, pp. 44-55.

Hornby et al., "Analysis of Full-waveform Sonic Data Acquired in Unconsolidated Gas Sands," XPO-55496081, Annual Logging Symposium, Sep. 1, 2000, 14 pages.

Jovanovic et al., "P and S Waves Separation from Vector VSP's by a Blocky Antialias Discrete Radon Transform," Application to Vinton Dome, LA, Oct. 10-15, SEG International Exposition and 74rh Annual Meeting, 4 pages.

Mari et al., "Automatic processing of full-waveform sonic data," XP055496091, SEG Technical Program Expanded Abstracts 1991, Jan. 1, 1991, 4 pages.

Moon et al., "Radon Transform Wave Field Separation for Vertical Seismic Profiling Data," Geophysics 51, Apr. 1986, pp. 940-947.

Murray et al., "Formation Compressional and Shear interval-Transit Time Logging by Means of Long Spacings and Digital Techniques," SPE 7446, Published in 1978, 11 pages.

Sacchi et al., "High-Resolution Velocity Gathers and Offset Space Reconstruction," Geophysics, vol. 60, Jul.-Aug. 1995, pp. 1169-1177.

Wang, "Antialiasing Conditions in the Delay-Time Radon Transform," Geophysical Prospecting 50, Published in 2002, pp. 665-672.

Wang, "Multiple Attenuation: Coping with the Spatial Truncation Effect in the Radon Transform Domain," Geophysical Prospecting 51, Published in 2003, pp. 75-87.

International Search Report and Written Opinion issued in International Application No. PCT/US2018/031399 dated Aug. 8, 2018, 15 pages.

* cited by examiner

PROCESSING METHODOLOGY FOR FULL-WAVEFORM SONIC WAVEFIELD SEPARATION

CROSS-REFERENCE TO RELATED APPLICATIONS

This application is a continuation application of and claims the benefit of priority to U.S. patent application Ser. No. 15/592,979, filed on May 11, 2017, the contents of which are hereby incorporated by reference.

TECHNICAL FIELD

This disclosure relates to full-waveform sonic (FWS) data processing.

BACKGROUND

Full-waveform sonic (FWS) devices can be used in wellbores to collect FWS data which can be processed to provide information about lithologic and fluid properties of a formation. Different from other geophysical measurements such as seismic and vertical seismic profile (VSP), FWS data is typically measured using a small sampling time interval, but a large offset spacing, thus contributing to an aliasing effect in the FWS data. Existing FWS processing methods overlook the aliasing effect and simply apply processing technologies that are developed in other fields to FWS data, causing uncertainty and inaccuracy in FWS wavefield separation results.

SUMMARY

The present disclosure describes methods and systems, including computer-implemented methods, computer program products, and computer systems of a processing methodology for full-waveform sonic (FWS) wavefield separation.

In some implementations, FWS data is received. An anti-aliasing linear Radon transform is performed on the received FWS data. Radon-transformed FWS data corresponding to a wave component is extracted using a slanted window. Signals of the wave component are determined by performing an inverse Radon transform on the extracted Radon-transformed FWS data.

The previously-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this disclosure can, in some implementations, efficiently separate FWS wave components free of aliasing artifacts by using anti-aliasing linear Radon transform (AALRT) and adaptive slant extraction (ASE). AALRT uses an anti-aliasing offset spacing determined by a designated velocity value to enable efficient localized interpolation of FWS data. ASE can adaptively adjust a slant window based on the FWS offset range so that a target wave can be extracted without including some or all undesired wave components. Comparing with a manual extraction method, ASE can save time and reduce human bias. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIGS. 3A-4C illustrate FWS wavefield separation for a synthetic FWS gather, according to some implementations.

Like reference numbers and designations in the various drawings indicate like elements.

DETAILED DESCRIPTION

The following detailed description describes a processing methodology for full-waveform sonic (FWS) wavefield separation and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from scope of the disclosure. Thus, the present disclosure is not intended to be limited to the described or illustrated implementations, but is to be accorded the widest scope consistent with the principles and features disclosed.

FWS devices can be used in wellbores to collect FWS data that can be processed to provide information about seismic and lithologic properties of a formation. FWS data can include information of linear or quasi-linear refraction waves, for example, compressional, shear, and Stoneley waves, characterized by different wave velocities. Linear Radon transform (or slant stack) can be used to extract different wave components for FWS wavefield separation. Although Radon transform has been used for seismic and VSP processing, usage on FWS data processing has been limited. Compared with seismic recording, FWS samples in spatial direction (that is, offset direction) are rather sparse than those in time direction. Due to the sparse spatial samples, an aliasing effect exists that hinders direct applications of Radon transform methodologies developed for seismic processing to FWS data.

Linear Radon transform transforms data from an offset (x)–time(t) domain into a slowness(p)–intercepter) Radon parameter domain based on a relationship of $t=px+\tau$, where offset x can represent a distance between a source transmitter and a receiver, $\tau$ indicates a travel time at zero offset (i.e. $x=0$), and slowness p can relate to a velocity v by $p=1/v$. For FWS data, due to dense time samples and sparse spatial samples, aliasing usually occurs in the slowness(p) direction. Based on Nyquist Law, an anti-aliasing condition to regulate the slowness sampling in the Radon parameter domain can be expressed as $$\Delta p < \frac{1}{f_{max} * (|x|_{max} - |x|_{min})}, \text{ or} \tag{1}$$

$$p < \frac{1}{f_{max} * \Delta x},$$

where $f_{max}$ is the maximum effective frequency of FWS data, $\Delta x$ is an offset spacing, $|x|_{max}$ and are the maximum and minimum offset distance in absolute value. For some FWS devices, the sampling time interval (that is, sampling time interval when recording FWS data) and offset spacing in FWS measurements are 2e-5 second (s) and 0.1524 meter (m), respectively. The Nyquist Law indicates that the maximum effective frequency can be $$f_{max} = \frac{1}{2 \times 2e^{-5}} = 25{,}000 \text{ Hz}.$$

Based on Equation (1), the slowness $$p < \frac{1}{25{,}000 \times 0.1524} = 0.0003$$

s/m and the velocity $$v > \frac{1}{0.0003} = 3810 \text{ m/s}.$$

In other words, the velocity range free of aliasing artifacts for the above FWS measurement setting is larger than 3810 m/s, exceeding shear and Stoneley wave velocities of most formations. In some other cases, FWS data can be acquired by FWS devices which can use an even smaller sampling time interval and a larger offset spacing, for example, 1e-5 s and 0.3048 m, and the wave velocity should be larger than 15240 m/s to avoid aliasing. In other words, many FWS wave components can be indistinguishable under aliasing artifacts.

At a high level, the described approach describes a processing flow for FWS wavefield separation by taking advantage of FWS wavefield features. The described approach uses anti-aliasing linear Radon transform (AALRT) and adaptive slant extraction (ASE) to separate wavefields. AALRT interpolates FWS data based on an anti-aliasing offset spacing. AALRT can flexibly tackle FWS aliasing effects based on an actual formation velocity range and thus generate a high-quality Radon image for wavefield separation. ASE can extract each wave component using a slant window that can adaptively fit the actual FWS configuration without including other wave component information.

In some implementations, FWS data is received. The received FWS data can be a common shot gather. An anti-aliasing linear Radon transform can be performed on the received FWS data. Radon-transformed FWS data corresponding to a wave component can be extracted using a slanted window. Signals of the wave component can be determined by performing an inverse Radon transform on the extracted Radon-transformed FWS data. The wave component can be one of a compressional wave, a shear wave, or a Stoneley wave. In some implementations, performing the anti-aliasing linear Radon transform can include determining a set of anti-aliasing offset values and a set of slowness values based on an anti-aliasing offset spacing, generating interpolated FWS data based on the received FWS data and the set of anti-aliasing offset values, and performing a Radon transform on the interpolated FWS data based on the set of anti-aliasing offset values and the set of slowness values. The anti-aliasing offset spacing can be $\Delta x_a = 0.5 * \Delta t * V_{min}$, where $\Delta t$ is a sampling time interval of the received FWS data, and $V_{min}$ is a lower boundary of a velocity of the wave component. In some implementations, a velocity analysis can be performed to determine a central velocity, a velocity range, a central time, and a time range of the wave component. The slanted window can be centered at a point determined based on the central velocity and the central time of the wave component, and the slanted window can have a size determined based on the velocity range and the time range of the wave component. In some implementations, performing an inverse Radon transform on the extracted Radon-transformed FWS data can include performing the inverse Radon transform based on a set of actual offset values.

Figure 1:
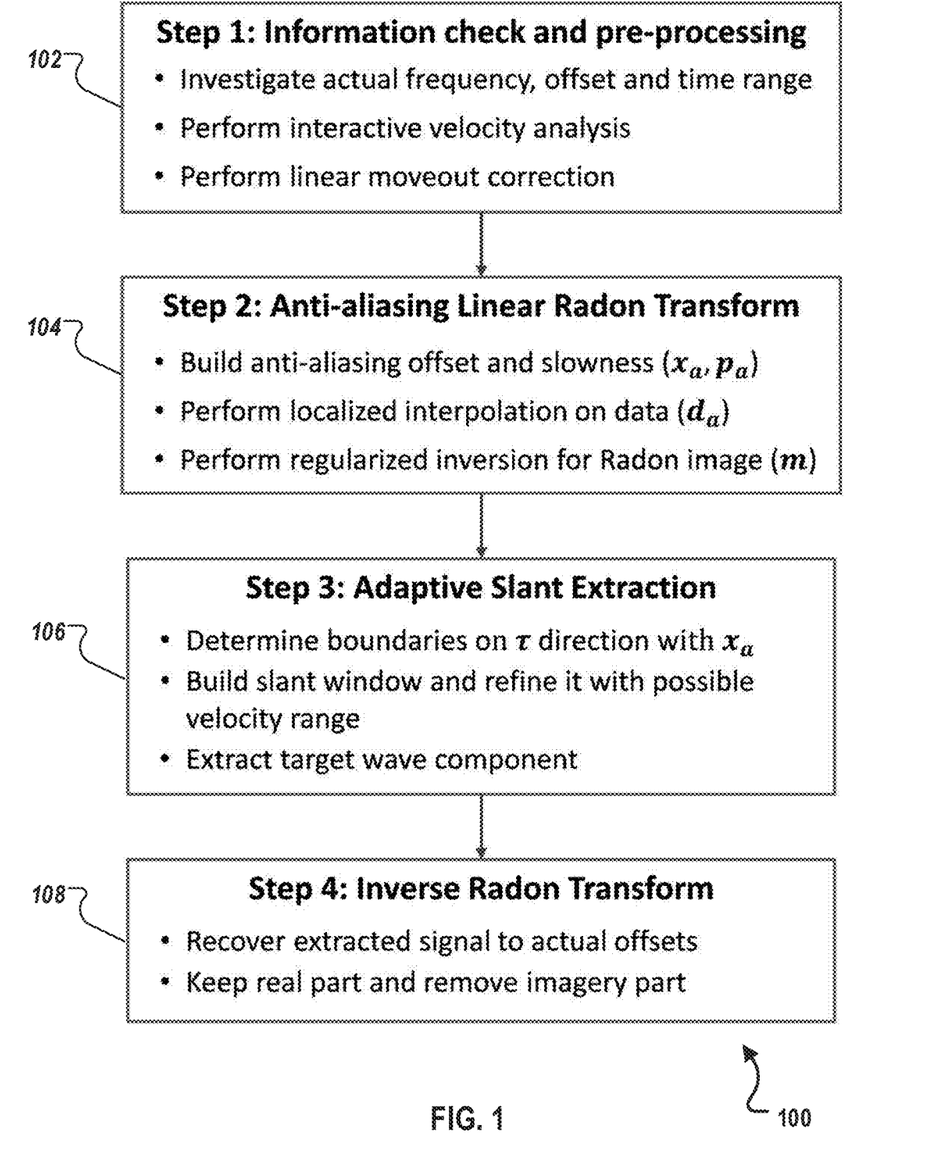
FIG. 1 is a flowchart of an example method for full-waveform sonic (FWS) wavefield separation, according to some implementations.

FIG. 1 is a flowchart of an example method 100 for FWS wavefield separation, according to some implementations. For clarity of presentation, the description that follows generally describes method 100 in the context of the other figures in this disclosure. For example, method 100 can be performed by a computer system described in FIG. 6, or any suitable system, environment, software, and hardware, or a combination of systems, environments, software, and hardware as appropriate. In some implementations, various steps of method 100 can be run in parallel, in combination, in loops, or in any order.

At a high level, the method 100 includes the following main steps: (1) information check and pre-processing; (2) anti-aliasing Linear Radon Transform; (3) adaptive slant extraction; and (4) inverse radon transform. At block 102, the method 100 includes receiving and pre-processing FWS data (or traces) of a target region. For example, the target region can include one or more earth subsurface layers. A FWS device including source(s) and receivers can be lowered down into a borehole in the target region. The FWS source can send acoustic waves or shots into the borehole and adjacent rock formations, and the receivers can measure and record refracted or reflected waves. The receiver can sample the received waveform in time with a sampling interval and record the sampled data. In some cases, the source can generate acoustic waves at different locations for the receivers to record reflected or refracted waves. For example, the FWS device can be lowered to a first depth in the borehole and the FWS source can transmit a first waveform or shot for the receivers to record refracted or reflected waves. The FWS device can then be moved to a second depth in the borehole and transmit a second waveform or shot. The recorded data at one receiver corresponding to a single source wave transmission or shot can be called a trace. In some implementations, the received FWS data at block 102 is a common shot gather including traces from a single shot recorded at many receivers.

The received FWS data can be pre-processed to generate information that can be used in the processing steps of blocks 104 and 106. The pre-processing can include interactive velocity analysis, linear moveout correction, and other pre-processing steps. The pre-processing can also determine a time range, an offset range, and a frequency range of the received FWS data. For example, the frequency range can be determined by performing a Fourier transform of the received FWS traces and identifying the maximum signal frequency in Fourier domain. The interactive velocity analysis can determine time and velocity information for each wave component. The velocity analysis can generate a velocity file including multiple types of information for each wave component, for example, a central time and a central velocity, as well as an upper boundary and a lower boundary for both time and velocity. The central velocity and time can be used not only in linear moveout correction to flatten dipped wave events, but also in determining a central location ($\tau_c$, $p_c$) of the wave component in Radon domain. The upper and lower boundary for velocity and time (that is, the velocity range and the time range), as well as ($\tau_c$, $p_c$), can be used for determining a slant window of ASE in block 106.

At block 104, an AALRT is performed on the received FWS data. In AALRT, instead of conventionally employed trace interpolation, a localized interpolation scheme is used in a Radon parameter domain to densify data information available. Based on the anti-aliasing condition in Equation (1), an anti-aliasing offset spacing can be defined as $\Delta x_a = 0.5 * \Delta t * V_{min}$, where $\Delta t$ is the sampling time interval when sampling received waves to record FWS data, and $V_{min}$ is a lower boundary of the wave velocity. For example, in block 102, a velocity lower boundary can be determined for each of the compressional, shear, and Stoneley waves, and $V_{min}$ can be the smallest of the three lower boundary values. Note that $\Delta x_a$ is a theoretical offset spacing for wave components with a velocity larger than $V_{min}$ to be effectively measured, processed, and free from aliasing artifacts. An anti-aliasing offset spread $x_a$ can be generated ranging from the first measured offset to the last measured offset and spaced by $\Delta x_a$. For example, if an actual offset spread (that is, actual distances between the source and multiple receivers in the FWS data acquisition) can be expressed as a vector x=[0.15 0.3 0.45 0.6] m with an offset spacing 0.15 m. Using an anti-aliasing offset spacing $\Delta x_a$=0.05 m, the anti-aliasing offset spread can be expressed as a vector $x_a$=[0.15 0.2 0.25 0.3 0.35 0.4 0.45 0.5 0.55 0.6] m.

For interpolating the received FWS data, the FWS common shot gather can be formed and transformed into a frequency domain (known as F-X domain). The FWS gather in the frequency domain can be used to determine linear representations such as gradient g and intercept i at the actual offset spread x based on $$[\text{Diag}(x) \quad \text{Diag}(1)] \begin{bmatrix} g \\ i \end{bmatrix} = d(f), \quad (2)$$

where Diag(x) is a diagonal matrix whose diagonal elements are the actual offset spread x, Diag(1) has the same size as Diag(x) and is a diagonal matrix whose diagonal elements are one, g and i are each a column vector having a same number of elements as the vector x, and d(f) is filtered FWS data centered around a frequency f. For example, d(f) can be generated by performing a discrete Fourier transform on the common shot gather, trace by trace, along the time direction, and d(f) can include Fourier transformed data at the particular frequency f from all or a subset of all traces. Equation (2) can be an under-determined inversion, and many regularization methods can be used to generate smooth estimates of g and i. In some implementations, Equation (2) can be solved for each frequency point from the discrete Fourier transform.

After g and i are determined, interpolated data $d_a(f)$ on anti-aliasing offset spread $x_a$ can be generated by performing a local interpolation. In some implementations, the local interpolation can be a forward application of Equation (2) by replacing x with $x_a$ and interpolating g and i for the anti-aliasing offset spread $x_a$. For example, the interpolated data $d_a(f)$ can be determined by $$d_a(f) = [\text{Diag}(x_a) \quad \text{Diag}(1)] \begin{bmatrix} g_a \\ i_a \end{bmatrix},$$

where Diag($x_a$) is a diagonal matrix whose diagonal elements are the anti-aliasing offset spread $x_a$, Diag(1) has the same size as Diag($x_a$) and is a diagonal matrix whose diagonal elements are one, and $g_a$ and $i_a$ each is a column vector having a same number of elements as the vector $x_a$.

The vectors $g_a$ and $i_a$ can be interpolated based on g and i using a principle of proximity. In other words, the gradient and intercept at an anti-aliasing offset is determined by the gradient and intercept at an actual offset that is closest to the anti-aliasing offset. For example, for an actual offset spread x=[0.15 0.3 0.45] m, g and i can be expressed as g=[$g_1$ $g_2$ $g_3$]$^T$ and i=[$i_1$, $i_2$, $i_3$]$^T$ respectively, where T denotes transpose. If the anti-aliasing offset spread is $x_a$=[0.15 0.2 0.25 0.3 0.35 0.4 0.45] m, since the anti-aliasing offset 0.2 m is closest to the actual offset 0.15 m, the gradient and intercept $g_1$ and $i_1$ at the actual offset 0.15 m can be used as the gradient and intercept at the anti-aliasing offset 0.2 m. In other words, $g_a$=[$g_1$,$g_1$,$g_2$,$g_2$,$g_2$,$g_3$,$g_3$] and $i_a$=[$i_1$,$i_1$,$i_2$,$i_2$,$i_2$,$i_3$,$i_3$].

The slowness sampling values $p_a$ in the Radon parameter domain corresponding to the anti-aliasing offset spread $x_a$ can be determined by substituting $x_a$ into the anti-aliasing condition of Equation (1). In other words, the ith element in the slowness sampling vector $p_a$ can be determined by $$p_{a(i)} = \frac{1}{f_{max} * x_{a(i)}}$$

where $x_{a(i)}$ is the ith element of the anti-aliasing offset vector $x_a$, and $f_{max}$ can be the maximum signal frequency of FWS data determined in block 102.

Radon transform of the interpolated FWS data on the anti-aliasing offset spread $x_a$ can be formulated as the following inversion form, $$Lm=d_a(f), \text{ where } L_{j,n}=\exp(-i2\pi f p_{a(j)} x_{a(n)}), \quad (3)$$

$x_{a(n)}$ is the nth element of the anti-aliasing offset vector $x_a$, $p_{a(j)}$ is the jth element of the slowness sampling vector $p_a$, and $L_{j,n}$ is the (j,n)th element of matrix L. A regularized solution to Equation (3) can generate Radon transformed data for the frequency f as $$m=L^H(LL^H+\mu I)^{-1}d_a(f), \quad (4)$$

where $L^H$ denotes a Hermitian transpose of L, $\mu$ is prewhitening factor to suppress noise influence. In some implementations, $\mu$ can be determined as a percentage (for example, a percentage between 0.1%~1%) of the maximum absolute value of $LL^H$. In some implementations, Equation (4) is used to generate the Radon transformed data for each frequency, and a Radon image is generated by transforming the Radon transformed data of all or a subset of all frequencies back into the time domain using an inverse Fourier transform. In other words, Equation (4) can be used to generate a Radon image of the interpolated FWS data. Even though Equation (3) has a similar form and solution as other Radon transform types, Equation (3) is different from others on two aspects: (1) $x_a$ is calculated and employed as the anti-aliasing offset spread that can well model the desired velocity range; (2) to compensate data information over $x_a$, the localized interpolation can obtain $d_a$ efficiently, and localized details on frequency and offset are greatly protected in the process.

At block 106, a slanted window can be used to extract a wave component from the Radon image generated in block 104. Cross-hatched energy clusters are typically observed in a Radon image due to finite spatial offsets, therefore routinely-employed rectangular windows are inefficient to extract the cross-hatched target signals from the Radon image. For FWS wavefield separation, rectangular extractions can cause incomplete or mixed extraction on the target wave component (as will be illustrated in FIG. 3B), thus degrading separation quality. ASE can use slant windows for FWS wavefield separation so that cross-hatched target signals can be efficiently captured according to given FWS configurations.

For extracting a target wave centered at $(\tau_c, p_c)$ in the Radon parameter domain, a half window length $n_\tau$ can be determined. For example, $n_\tau$ can be determined so that the slanted window can enclose the target wave in the Radon domain. In some implementations, the velocity and time analysis performed at block 102 can be used to determine the slant window. The upper and lower boundary of the slanted window in the i direction can be determined by $$\begin{cases} \text{Upper: } \min\left(\begin{bmatrix} (\tau_c - n_\tau) - \min(\text{abs}(x_a)) * p_a, \\ (\tau_c - n_\tau) - \max(\text{abs}(x_a)) * p_a \end{bmatrix}\right) \\ \text{Lower: } \max\left(\begin{bmatrix} (\tau_c + n_\tau) - \min(\text{abs}(x_a)) * p_a, \\ (\tau_c + n_\tau) - \max(\text{abs}(x_a)) * p_a \end{bmatrix}\right) \end{cases} \quad (5)$$

where abs denotes an operation of taking absolute value, min and max denote a minimum and a maximum operation, respectively, operator * in $\min(\text{abs}(x_a))*p_a$ and $\max(\text{abs}(x_a))*p_a$ denotes an element-by-element multiplication, and $(\tau_c, p_c)$ is determined in block 102. The resultant upper and lower boundary from Equation (5) are vectors having the same size as the vector $p_a$, and elements in the upper and lower boundary vectors represent boundary values at the corresponding slowness sampling values $p_a$. In Equation (5), the anti-aliasing offset variable $x_a$ enables an adaptive description of the cross-hatched target signals, and the minimum and maximum operations can enlarge the window area for extraction. In some implementations, the extraction window can be further refined if the velocity range or the time range of the target wave is available. For example, based on the velocity range of the target wave determined in block 102, instead of using full vectors $p_a$ and $x_a$ in Equation (5), a subset of $p_a$ and $x_a$ corresponding to the determined velocity range can be used to derive the slant window. In some implementations, the half window length $n_\tau$ can be determined based on the time range of the target wave determined in block 102.

At block 108, signals of the target wave component can be recovered by performing an inverse Radon transform on the extracted component in the Radon parameter domain. For example, an inverse Radon transform can be performed on the actual offset spread x using Equation (3). In some implementations, results of the inverse Radon transform can be complex numbers, and the wave component can be recovered using the real part of the complex numbers and removing the imagery part.

Figure 2A:
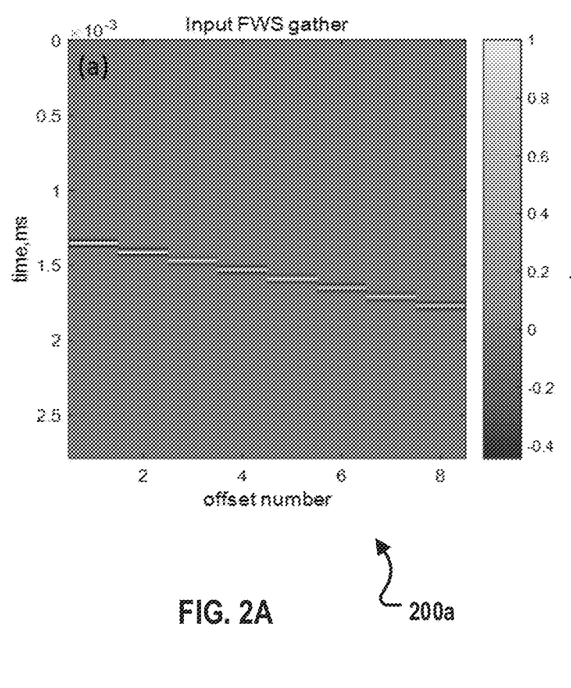
FIGS. 2A-2C illustrate FWS wavefield separation for a compressional wave, according to some implementations.
Figure 2B:
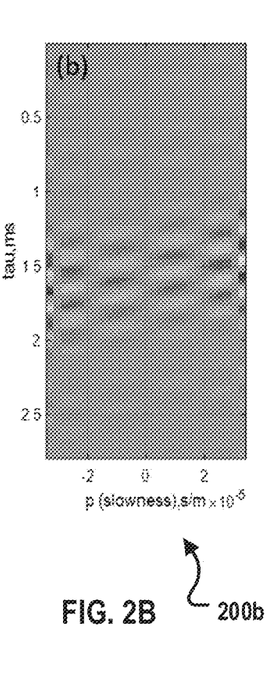
Figure 2C:
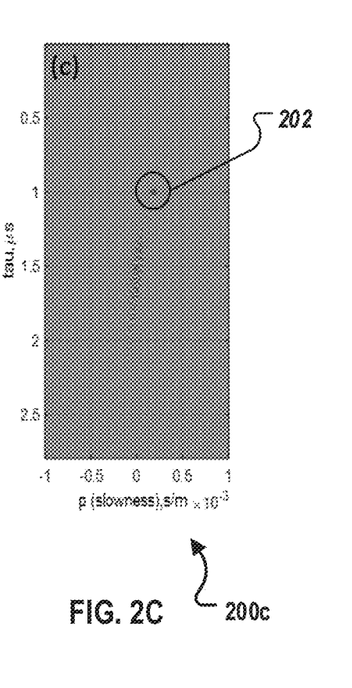

FIGS. 2A-2C illustrate FWS wavefield separation for a compressional wave, according to some implementations. FIG. 2A illustrates a synthetic FWS gather 200a that simulates a compressional wave with a wave speed of 5000 m/s, recorded on 8 receivers with a spacing of 0.3048 m. The sampling time interval for data recording is 1e-5 s, and the dominant frequency of the synthetic FWS gather is 10 kHz. The horizontal and vertical axis in FIG. 2A represent an offset index and a time, respectively. FIG. 2B illustrates a Radon image 200b after a direct application of a traditional Radon transform on the synthetic FWS gather 200a. FIG. 2B shows that a traditional Radon transform can lead to a scattered energy map, indicating that the wave component is indistinguishable. FIG. 2C illustrates a Radon image 200c after applying AALRT on the synthetic FWS gather 200a. The dot 202 represents the compressional wave component, which has a slowness 2e-3 s/m, that is, an inverse of the wave speed 5000 m/s. FIG. 2C also shows that after applying AALRT that includes adopting the anti-aliasing offset $x_a$ and performing local interpolation, the Radon image 200c becomes more focused in the slowness(p)–intercept($\tau$) domain when compared to the Radon image 200b. For example, traditional Radon transform generates the Radon image 200b of slowness sampling values ranging from −2e-5 s/m to 2e-5 s/m, while AALRT generates the Radon image 200c of anti-aliasing slowness sampling values ranging from −1e-3 s/m to 1e-3 s/m. In other words, wave components of a speed larger than 1000 m/s can be effectively modelled and characterized in Radon parameter domain using AALRT.

Figure 3A:
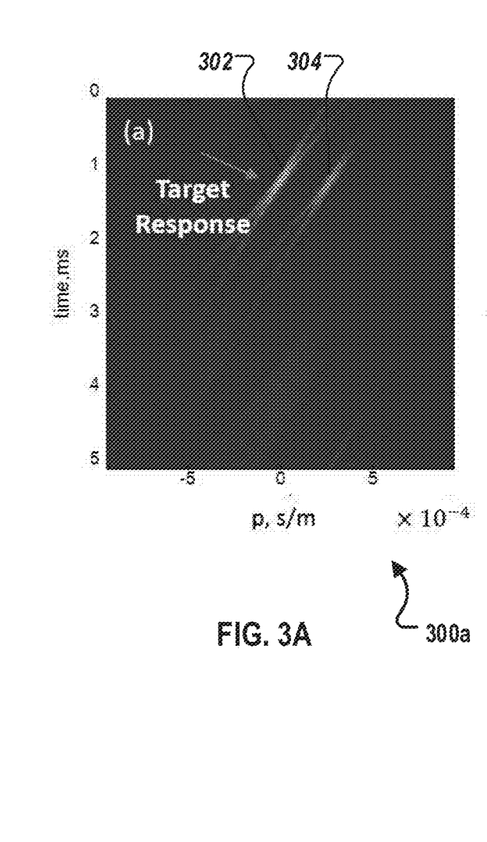
Figure 3B:
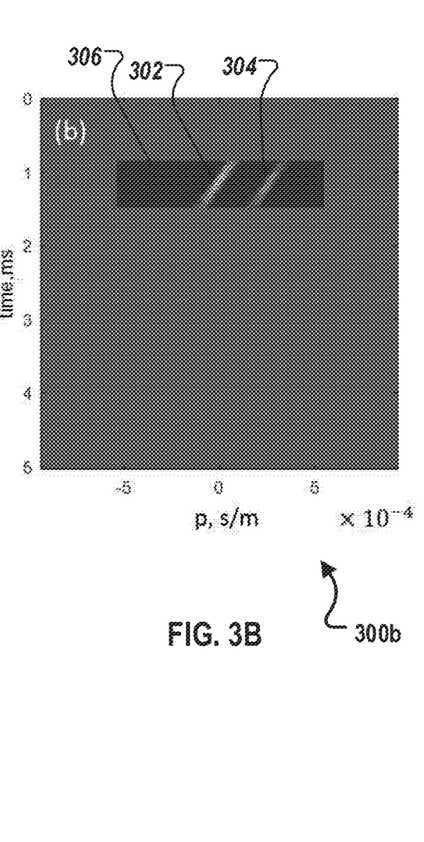
Figure 3C:
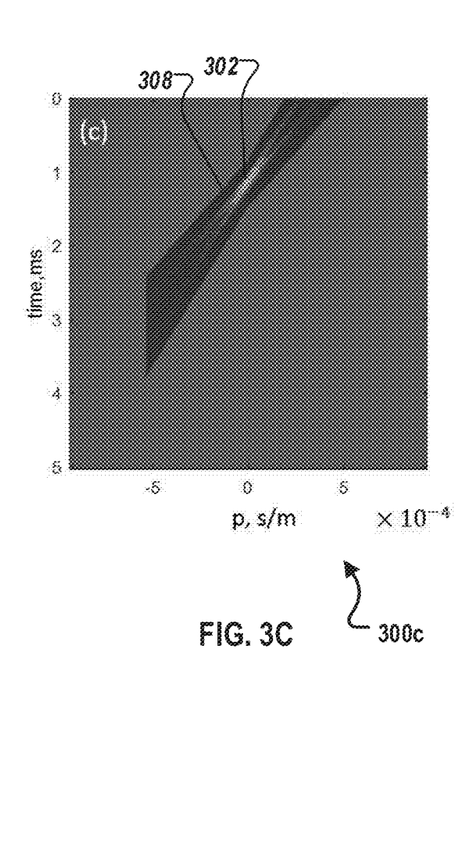
Figure 4A:
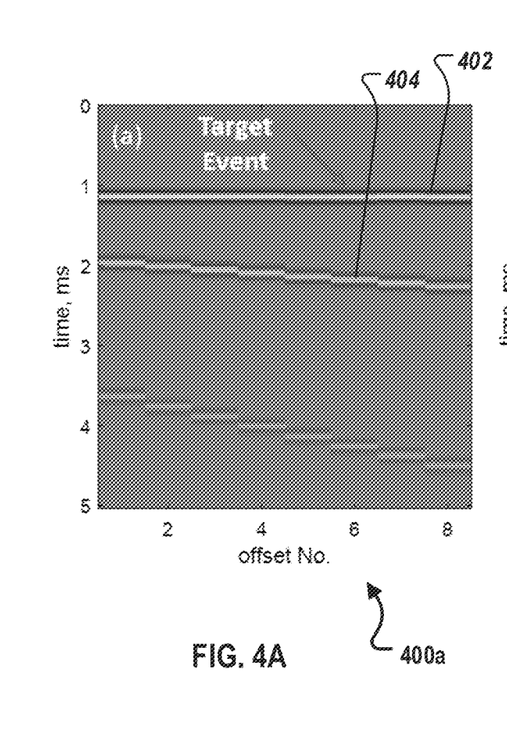
Figure 4B:
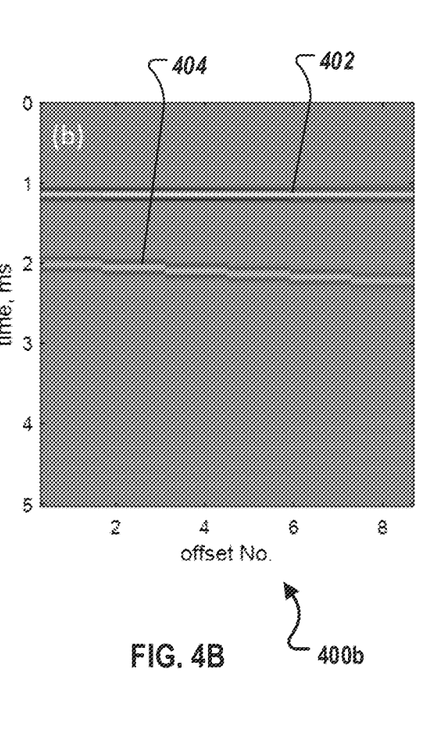
Figure 4C:
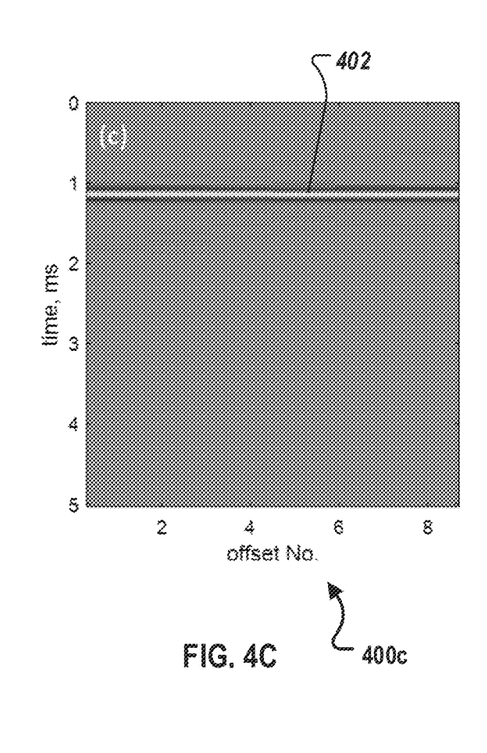

FIGS. 3A-4C illustrate FWS wavefield separation for a synthetic FWS gather, according to some implementations. The synthetic gather simulates compressional, shear, and Stoneley waves with different dominant frequencies, recorded by 8 receivers with a spacing of 0.3048 m. FIGS. 3A-3C illustrate the wavefield separation in a Radon domain, and FIGS. 4A-4C illustrate wavefield in an offset (x)–time(t) domain corresponding to FIGS. 3A-3C. FIGS. 4A-4C can be generated by performing an inverse Radon transform of FIGS. 3A-3C, respectively. FIG. 3A shows a total wavefield 300a including a compressional wave 302 and a shear wave 304 in a Radon domain, where linear moveout correction of the compressional wave has been performed and the compressional wave 302 is the target wave to be separated. FIG. 4A illustrates a total wavefield 400a of the synthetic FWS gather in an offset-time domain including a compressional wave 402 and a shear wave 404. FIG. 3B shows that a small rectangular window is incapable of capturing complete features of the target wave component 302, while a large window 306 can easily cut into other wave component such as the shear wave 304, leading to an impure separation result as shown in FIG. 4B, where the shear wave 404 is present in addition to the target compressional wave 402. FIG. 3C illustrates that a slant window 308 of ASE can extract the target component 302 without cutting into the shear wave 304. FIG. 4C illustrates that ASE generates a clean separation result including the target compressional wave 402, but not the shear wave 404.

Figure 5A:
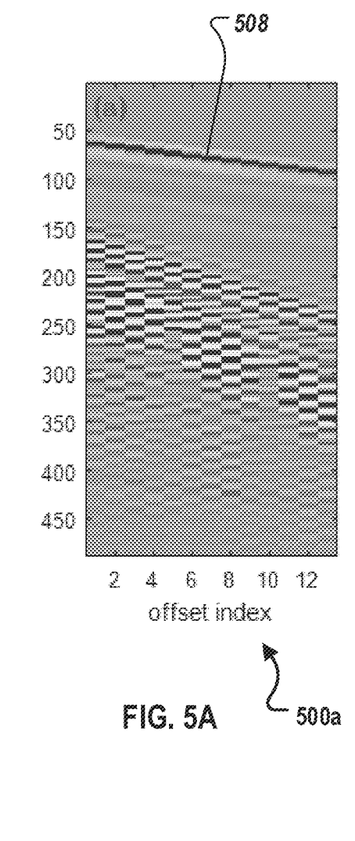
FIGS. 5A-5D illustrate FWS wavefield separation for a real FWS gather, according to some implementations.
Figure 5B:
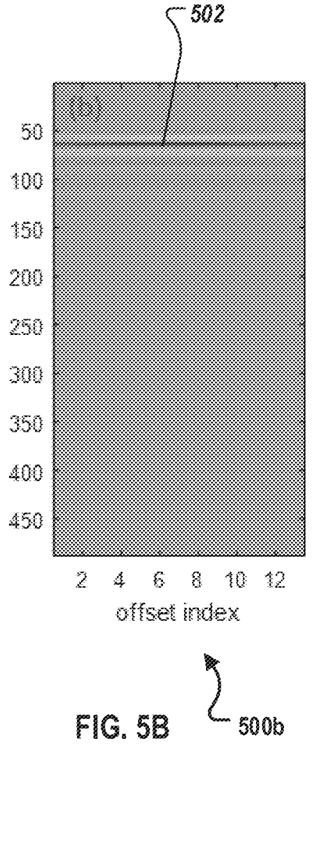
Figure 5C:
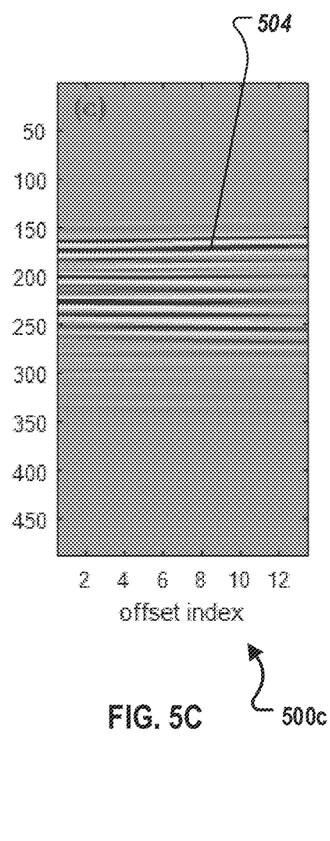
Figure 5D:
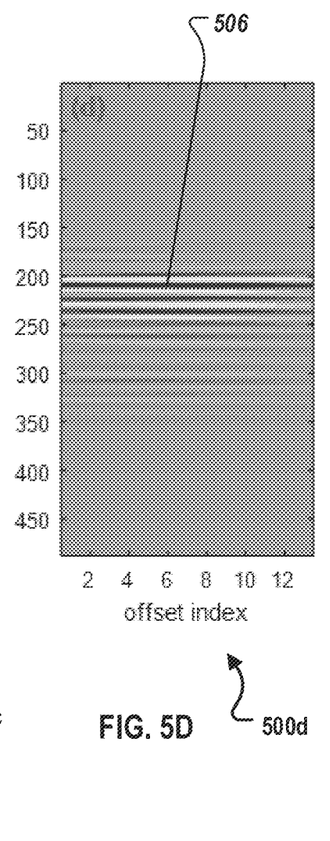

FIGS. 5A-5D illustrate FWS wavefield separation for a real FWS gather, according to some implementations. FIG. 5A illustrates the real FWS shot gather 500a, where the vertical and horizontal axis represent a time sample index and an offset index of the FWS gather. The FWS gather 500*a* shows that except for the shallow compressional wave component 508, shear and Stoneley waves are indistinguishable due to aliasing effects. Noise is also an unfavorable factor for wavefield separation, especially for a deep Stoneley wave. FIGS. 5B-5D illustrate separation results by using the described approach on the FWS gather 500*a*. FIGS. 5B-5D show separated compressional wave 502, Shear wave 504, and Stoneley wave 506, respectively, illustrating that the described approach can generate high-quality separation results in spite of practical adversaries such as aliasing and noises.

Figure 6:
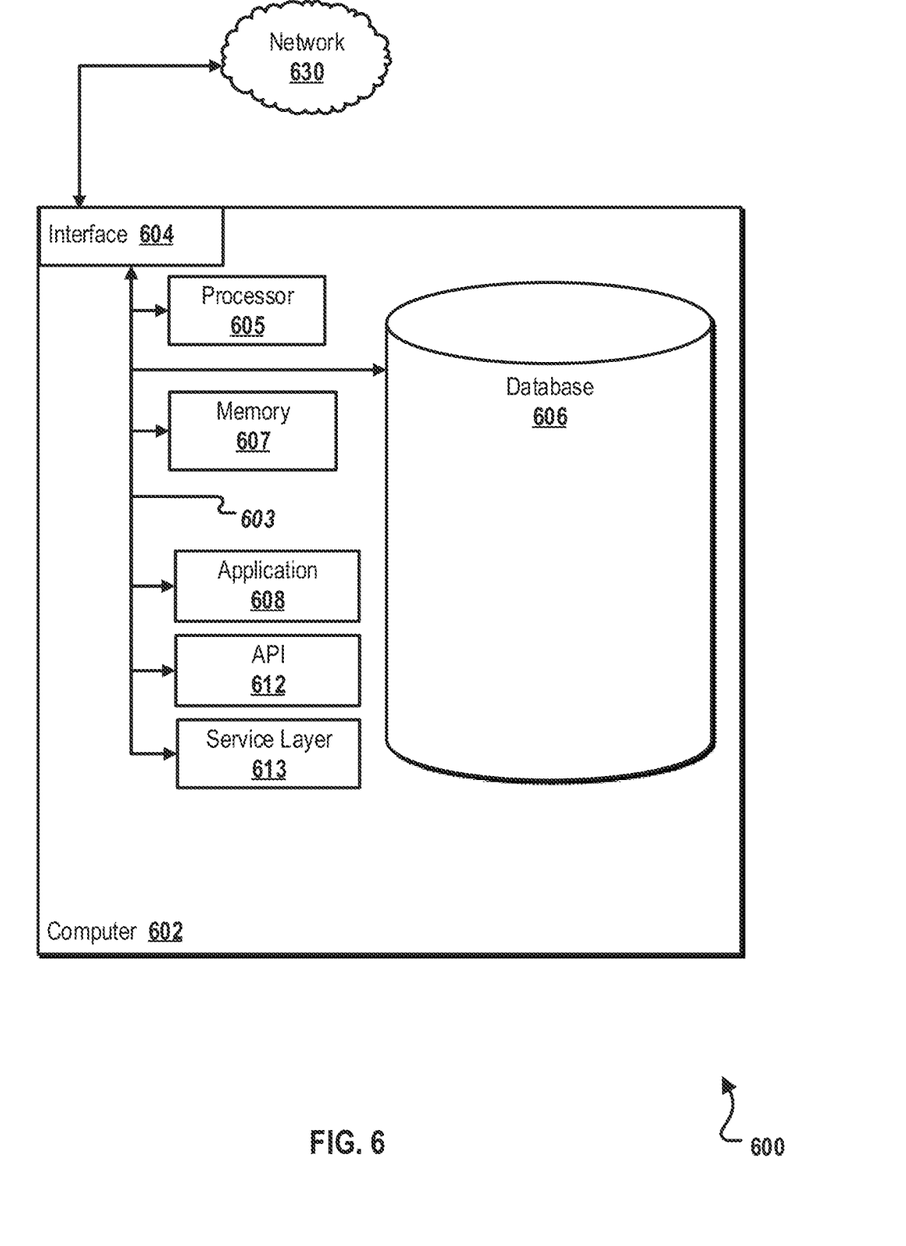
FIG. 6 is a block diagram illustrating an example computer system used to provide computational functionalities associated with described algorithms, methods, functions, processes, flows, and procedures as described in the instant disclosure, according to some implementations.

FIG. 6 is a block diagram of an example computer system 600 used to provide computational functionalities associated with described algorithms, methods, functions, processes, flows, and procedures as described in the instant disclosure, according to some implementations. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, or other server (or a combination of servers).

The computer 602 can receive requests over network 630 from a client application (for example, executing on another computer 602) and responding to the received requests by processing the received requests using an appropriate software application(s). In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 comprises logic encoded in software or hardware (or a combination of software and hardware) and is operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory, conventional, or other type of database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602. For example, the database 606 can hold FWS data.

The computer 602 also includes a memory 607 that can hold data for the computer 602 or other components (or a combination of both) that can be connected to the network 630 (whether illustrated or not). For example, memory 607 can be random access memory (RAM), read-only memory (ROM), optical, magnetic, and the like storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

There may be any number of computers 602 associated with, or external to, a computer system containing computer 602, each computer 602 communicating over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A method, comprising:
   using a full-waveform sonic (FWS) device to generate FWS data of a formation, wherein the FWS device is disposed in proximity of a borehole located in the formation, and wherein the FWS data comprises a plurality of wave components;
   performing an anti-aliasing linear Radon transform on the FWS data;
   extracting Radon-transformed FWS data corresponding to a first wave component using a slanted window; and
   determining signals of the first wave component by performing an inverse Radon transform on the extracted Radon-transformed FWS data, thereby separating the first wave component from the plurality of wave components.

2. The method of claim 1, wherein the first wave component is one of a compressional wave, a shear wave, or a Stoneley wave.

3. The method of claim 1, wherein performing the anti-aliasing linear Radon transform includes:
   determining a set of anti-aliasing offset values and a set of slowness values based on an anti-aliasing offset spacing;
   generating interpolated FWS data based on the generated FWS data and the set of anti-aliasing offset values; and
   performing a Radon transform on the interpolated FWS data based on the set of anti-aliasing offset values and the set of slowness values.

4. The method of claim 1, further comprising performing a velocity analysis to determine a central velocity, a velocity range, a central time, and a time range of the first wave component.

5. The method of claim 4, wherein the slanted window is centered at a point determined based on the central velocity and the central time of the first wave component, and the slanted window has a size determined based on the velocity range and the time range of the first wave component.

6. The method of claim 1, wherein performing an inverse Radon transform on the extracted Radon-transformed FWS data comprises performing the inverse Radon transform based on a set of actual offset values.

7. The method of claim 1, wherein the generated FWS data is a common shot gather.

8. A system, comprising:
   a computer memory; and
   one or more hardware processor interoperably coupled with the computer memory and configured to perform operations comprising:
      using a full-waveform sonic (FWS) device to generate FWS data of a formation, wherein the FWS device is disposed in proximity of a borehole located in the formation, and wherein the FWS data comprises a plurality of wave components;
      performing an anti-aliasing linear Radon transform on the FWS data;
      extracting Radon-transformed FWS data corresponding to a first wave component using a slanted window; and
      determining signals of the first wave component by performing an inverse Radon transform on the extracted Radon-transformed FWS data, thereby separating the first wave component from the plurality of wave components.

9. The system of claim 8, wherein the first wave component is one of a compressional wave, a shear wave, or a Stoneley wave.

10. The system of claim 8, wherein performing the anti-aliasing linear Radon transform includes:
    determining a set of anti-aliasing offset values and a set of slowness values based on an anti-aliasing offset spacing;
    generating interpolated FWS data based on the generated FWS data and the set of anti-aliasing offset values; and
    performing a Radon transform on the interpolated FWS data based on the set of anti-aliasing offset values and the set of slowness values.

11. The system of claim 8, wherein the operations further comprise performing a velocity analysis to determine a central velocity, a velocity range, a central time, and a time range of the first wave component.

12. The system of claim 11, wherein the slanted window is centered at a point determined based on the central velocity and the central time of the first wave component, and the slanted window has a size determined based on the velocity range and the time range of the first wave component.

13. A non-transitory, computer-readable medium storing one or more instructions executable by a computer system to perform operations comprising:
    using a full-waveform sonic (FWS) device to generate FWS data of a formation, wherein the FWS device is disposed in proximity of a borehole located in the formation, and wherein the FWS data comprises a plurality of wave components;
    performing an anti-aliasing linear Radon transform on the FWS data;
    extracting Radon-transformed FWS data corresponding to a first wave component using a slanted window; and determining signals of the first wave component by performing an inverse Radon transform on the extracted Radon-transformed FWS data, thereby separating the first wave component from the plurality of wave components.

14. The non-transitory, computer-readable medium of claim 13, wherein the first wave component is one of a compressional wave, a shear wave, or a Stoneley wave.

15. The non-transitory, computer-readable medium of claim 13, wherein performing the anti-aliasing linear Radon transform includes:
   determining a set of anti-aliasing offset values and a set of slowness values based on an anti-aliasing offset spacing;
   generating interpolated FWS data based on the generated FWS data and the set of anti-aliasing offset values; and
   performing a Radon transform on the interpolated FWS data based on the set of anti-aliasing offset values and the set of slowness values.

16. The non-transitory, computer-readable medium of claim 13, wherein the operations further comprise performing a velocity analysis to determine a central velocity, a velocity range, a central time, and a time range of the first wave component.

17. The non-transitory, computer-readable medium of claim 16, wherein the slanted window is centered at a point determined based on the central velocity and the central time of the first wave component, and the slanted window has a size determined based on the velocity range and the time range of the first wave component.

* * * * *